United States Patent [19]

Shepherd et al.

[11] Patent Number: 4,911,327

[45] Date of Patent: Mar. 27, 1990

[54] DISPENSER

[75] Inventors: Charles G. Shepherd, Oakville; Edward G. K. Agnew, Campbellville, both of Canada; Michel Silberfeld, 179 Lyndhurst, Toronto, Ontario, Canada, M5R 3A1

[73] Assignee: Michel Silberfeld, Toronto, Canada

[21] Appl. No.: 180,750

[22] Filed: Apr. 12, 1988

[51] Int. Cl.⁴ .............................................. B65D 83/04
[52] U.S. Cl. ........................................ 221/3; 221/15; 221/82
[58] Field of Search ..................... 221/2, 3, 5, 15, 82

[56] References Cited

U.S. PATENT DOCUMENTS

| | | | |
|---|---|---|---|
| 693,723 | 2/1902 | Law | 221/82 |
| 3,712,507 | 1/1973 | Holt | 221/82 |
| 3,727,794 | 4/1973 | DiEranco | 221/3 |
| 4,572,403 | 2/1986 | Benardya | 221/3 |
| 4,616,316 | 10/1986 | Hanpanter et al. | 364/413 |
| 4,747,514 | 5/1988 | Stone | 221/82 X |
| 4,748,600 | 5/1988 | Urquhart | 221/15 X |
| 4,763,810 | 8/1988 | Christiansen | 221/15 X |
| 4,768,176 | 8/1988 | Kehr et al. | 221/15 X |

*Primary Examiner*—Andres Kashnikow
*Assistant Examiner*—Matthew C. Graham
*Attorney, Agent, or Firm*—Rogers & Scott

[57] ABSTRACT

A dispenser for providing scheduled dosages of pills according to a predetermined medication program includes a housing containing a plurality of pill containers from which dosages of pills may be released into a user-accessible pill receiver. The release of pills is controlled such that pills are released at predetermined intervals as dictated by the medication program. On release of dosage of pills, an alarm is activated to indicate to a user that a dosage is due to be taken, the alarm being deactivated when the user accesses the pill receiver to remove the dosage of pills. If the user does not access the pill receiver within a predetermined time interval from release of the dosage, an optional remote alarm may be activated to alert a supervisor.

7 Claims, 5 Drawing Sheets

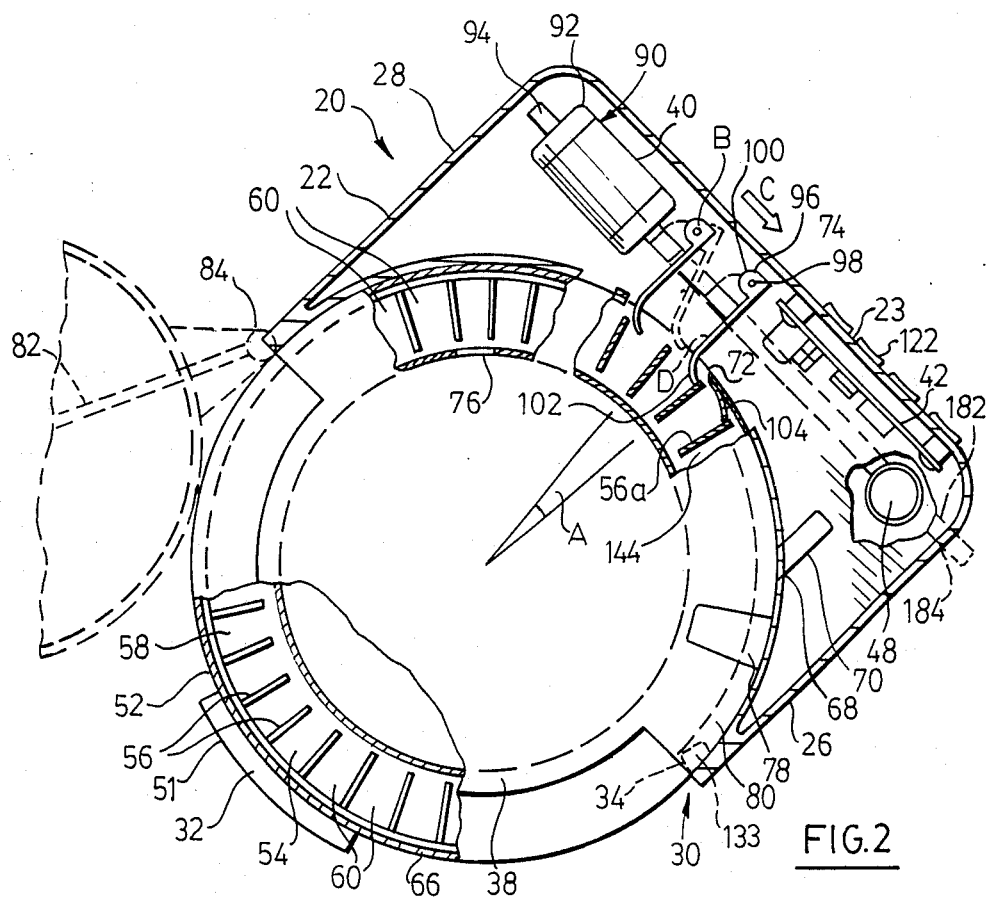
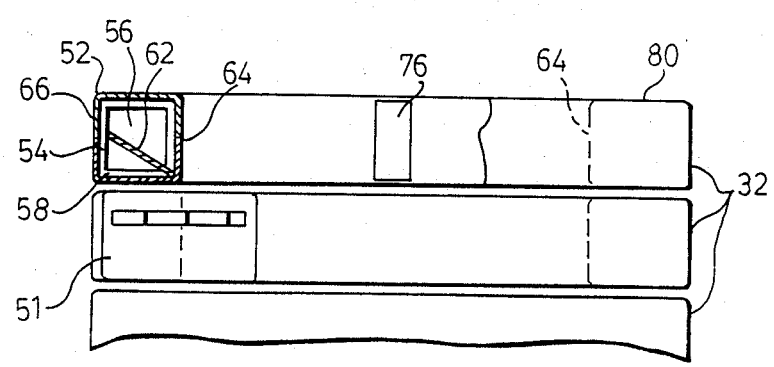
FIG.2
FIG.3

DISPENSER

This invention relates to a dispenser for use in dispensing pills, tablets, capsules, pellets and the like and in particular to a dispenser for automatically dispensing dosages of non-liquid medications according to a predetermined medication program.

For the purposes of this description the word "pills" will be used as a representative term for pills, capsules, tablets, pellets and the like, and is not intended to limit the scope of the invention in any way.

Large numbers of persons regularly take medications or diet supplements without medical supervision. Such persons depend to a large extent on memory to take the correct dosage at the correct time intervals. Understandably, many persons forget to take dosages at the correct time or may take an incorrect dosage. This problem is considerably increased in persons who are absent minded or cognitively impaired. Whereas in most cases, there is no great danger to health incurred by missing a planned dosage of medication or diet supplement, or by neglecting to take a dosage at the correct time, in some circumstances the health of a patient may suffer to a great extent. Also, the effectiveness of, for example a course of antibiotics, can be greatly impaired by not following a strict medication program.

Various configurations of pill reminders have been produced to facilitate adherence to medication or diet programs. It is known to provide a divided pill box in which each divided portion is filled with a dosage of pills. Of course this form of reminder is only effective if the person remembers that the pills must be taken at a particular time of day. Also, such pill boxes are generally small and are required to be regularly replenished, and as each divided portion may contain a number of different medications there is the possibility that a person may confuse similar looking pills, resulting in incorrect dosages being placed in each portion.

Perhaps the most well known medication compliance dispenser is that used with oral contraceptives that must be taken daily over a predetermined period. These utilize a blister pack having an array of plastic blisters defining compartments for individual pills, with a frangible backing sheet which is successively numbered behind each compartment indicating the order in which the pills must be taken. There is also an indication of the day on which the first pill was taken and by comparing this with the numbers on the backing sheet it is possible to ascertain whether the program is being followed. However, some forms of oral contraceptives are only effective if they are taken at a set time each day and the dispenser does not provide a reminder if this time is passed without a pill being taken.

A more advanced medication compliance monitoring system is described in U.S. Pat. No. 4,116,316 to Hanpeter et al. This system also consists of a blister pack having a array of plastic blisters defining compartments for medication, with a frangible non-conductive backing sheet. However, the backing sheet has conductive traces behind the compartments which are ruptured when the medication dosages are removed. A memory circuit is provided which monitors the backing sheets and records the times when a pill is taken from the blister pack and the appropriate conductive trace broken. When the patient visits their physician the blister pack is connected to a micro-computer which retrieves the dose removal time data from the memory circuit and provides a display of removal times. This allows the physician to analyze compliance with the prescribed medication program. However, as with the oral contraceptive dispenser described above, the system does not provide any means for reminding the patient to take dosages of pills between visits to the physician and does not provide the patient or the physician with an immediate indication that the medication program is not being followed.

Accordingly, it is an object of the present invention to provide a dispenser which automatically provides scheduled dosages of pills according to a predetermined medication program.

It is another object of the present invention to provide a dispenser which provides a visual or audible indication of when a dosage of pills is scheduled.

It is a further object of the present invention to provide a dispenser which automatically provides scheduled dosages of pills according to predetermined medication program including a medication container carrying medication program information, which information is supplied to the dispenser and controls its operation.

Accordingly, in one of its aspects the present invention provides a dispenser for providing scheduled dosages of pills according to a predetermined medication program including a housing containing pill storage containers from which dosages of pills may be released into a user accessible pill receiver. The release of pills from the storage containers is controlled such that pills are released at predetermined intervals as dictated by the medication program.

In another of its aspects, the present invention provides a dispenser for providing scheduled dosages of pills according to a predetermined medication program including a housing containing pill storage containers from which dosages of pills may be released at predetermined intervals as dictated by the medication program. On release of a dosage of pills a signal is produced to indicate to the user that a dosage of pills is ready to be taken.

In a further one of its aspects, the present invention provides a dispenser for providing scheduled dosages of pills according to a predetermined medication program including a housing containing pill storage containers from which dosages of pills are released at predetermined interval as dictated by the medication program. The medication program is embodied in the pill storage containers and is monitored by the dispenser.

These and other aspects of the invention will be better understood with reference to the accompanying drawings, in which:

FIG. 2 is a part cut-away plan view of the dispenser of FIG. 1;

FIG. 3 is a part sectional side view of pill trays of the dispenser of FIG. 1;

Figure 1:
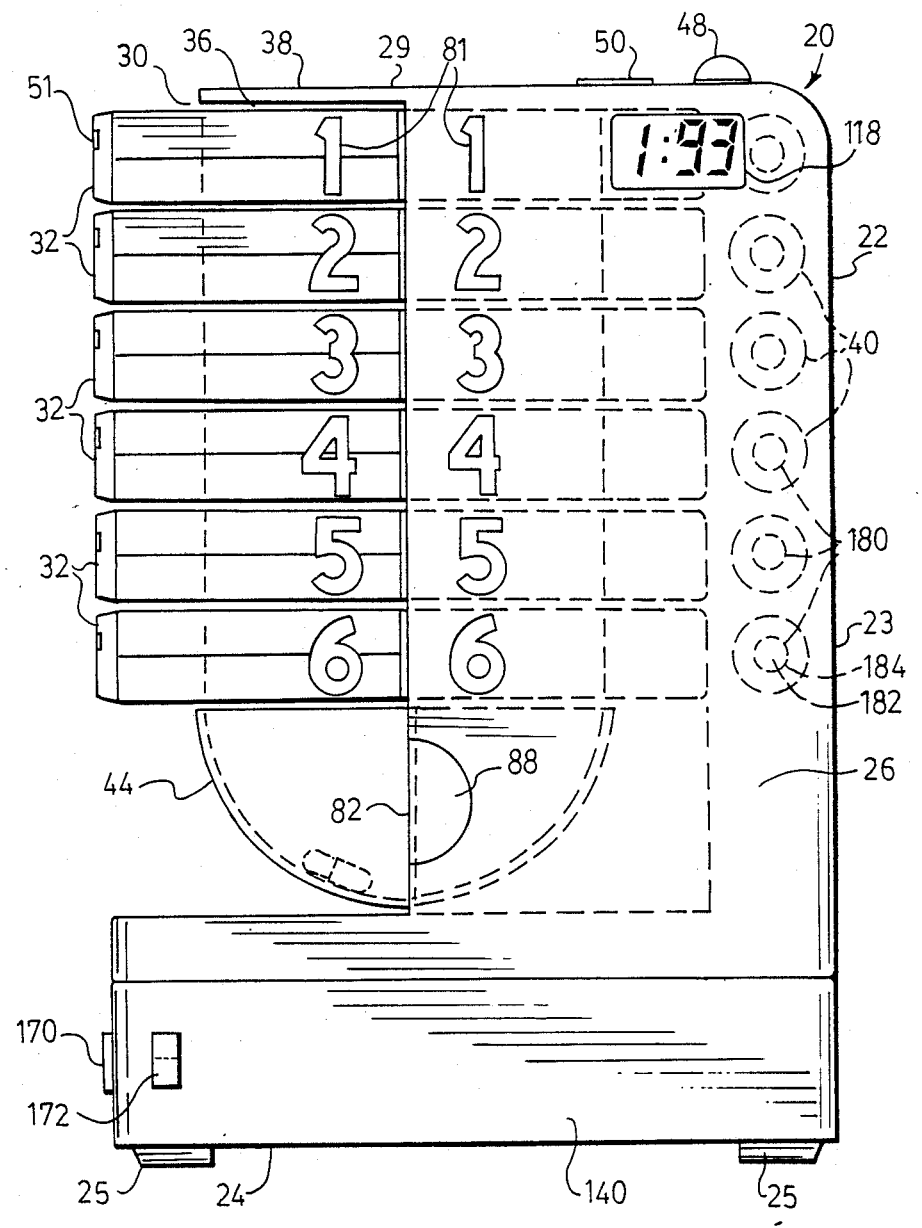
FIG. 1 is a side view of a dispenser in accordance with a preferred embodiment of the present invention.

Reference is made firstly to FIGS. 1 and 2 of the drawings which show a dispenser, generally indicated by the numeral 20, in accordance with a preferred embodiment of the present invention. Before describing the dispenser in detail, the main elements of the dispenser 20 will be described, followed by a brief description of the operation of the dispenser.

The dispenser comprises a housing 22 having an upright back 23, a supporting base 24 provided with resilient feet 25, sides 26, 28, and a top 29, and having an open front 30 to receive a stack of individually supported pill trays 32. The pill trays 32 are received by semi-circular shelves 34 around the edge of a walled semi-circular recess 36 which extends into the housing 22. The top 29 has a semi-circular extension 38 which extends over the recess 36. Mounted on the back 23 of the housing is a series of actuators 40 for acting on respective ones of the pill trays 32. The actuators 40 are activated from a control circuit contained in a printed circuit board 42 also mounted on the back 34 of the housing.

Under the control of a micro processor in the printed circuit board 42, the actuators 40 are selectively activated to act on the pill trays 32 such that a dosage of pills falls from at least one of the trays 32 into a pill hopper 44 located beneath the stack of trays 32. When one of actuators 40 has been activated and pills released, the micro processor activates a flashing light 48 and a buzzer 50, both mounted on the top of the housing 22. When a user opens the pill hopper 44 (FIG. 1) to remove the dosage of pills that has been deposited therein, the flashing light 48 and buzzer 50 are deactivated. If the dosage of pills is not removed from the hopper 44 within a predetermined time an optional remote signal is activated and a supervisor, for example a nurse, may then call on the use to ascertain why the dosage was not taken.

The dispenser 20 will now be described in detail, the structure and operation of the dispenser being described first followed by a description of an exemplary control system.

As mentioned above, the pill trays 32 are arranged in a stack within the housing 22. As can be seen from FIGS. 2 and 3 of the drawings, each tray 32 is annular, and has a substantially square hollow cross section apart from an extending portion 51 details of which are provided below. An outer package 52 of the each tray 32 is fixed in position relative to the housing 22, and contains an inner conveyor portion 54 which may rotate within the outer package 52, which is conveniently formed of upper and lower halves ultrasonically welded together. The conveyor portion 54 is provided with a plurality of upright radial dividers 56 which extend upwardly from a base 58 to divide the conveyor portion 54 into a plurality of discrete pill containing portions 60. Each pill containing portion 60 is provided with a ramped floor 62 which causes any pills in the portion 60 to slide into contact with an inner wall 64. The package 52 also has an outer wall 66 which is apertured at 68 to receive a locating pin 70 which extends from a wall of the semi circular recess 36. This serves to lock, orientate and locate the pill tray 32 relative to the housing 22. A second and larger aperture 72 is also provided in the outer wall 66 to receive a pawl 74 of the actuator 40 associated with the tray 32. The aperture 72 is approximately equal in width to two pill containing portions 60.

The pawl 74 acts on a lower portion of a divider 56 to rotate the inner conveyor portion 54 through an angle "A", equal to the angle occupied by each pill containing portion 60 and further details of this operation will be provided below. As the conveyor portion 54 is rotated within the outer package 52 by the action of the actuator 40, successive pill containing portions 60 are brought into communication with a dispensing slot 76 in the inner wall 64 of the outer package such that pills in the pill containing portion 60 fall from the pill tray 32 into the pill hopper 44. An aperture 78 is also provided in an upper wall 80 of the outer package 52 to allow refilling of the pill tray 22.

To ensure that pill trays 32 are located on the correct shelves 34, raised numbers 81 (FIG. 1) are provided on each package 52 and on corresponding portion of the side 26 of the housing. The raised numbers 81 provide a tactile, as well as a visual, indication of the correct location of the trays 32.

Pills fall from the pill trays under the influence of gravity into the pill hopper 44 which is located below the stack of pill trays 32. The hopper 44 is in the form of a hemisphere and has a diameter slightly greater than that of the inner wall 64 of the outer package 52. The hopper 44 is provided with the stiffening rib 82 which extends parallel to the back 23 of the housing when the hopper 44 is in a closed position as shown in FIG. 1, ready to receive dosages of pills from the pill trays 32. The rib 82 extends beyond the periphery of the hopper 44 and is provided at one end with a hinge 84 for pivotal connection with the side 28 of the housing 22 such that the hopper 44 may be rotated from the receiving position to an access position, as is partly shown in broken outline in FIG. 1. On the other side of the hopper 44 from the hinge assembly the rib 82 extends to the side 26 of the housing 22, which has a semi circular depression 88 FIG. 1) to provide a finger pull for a user.

As was mentioned above, the actuators 40 are mounted on the back of the housing 23 and are used to rotate the inner conveyor portion 54 of the pill trays 32 causing pills to be released into the hopper 44, an actuator 40 being provided for each pill tray 32. Reference is now made in particular to FIG. 2 which shows the operation of an actuator, which in this case is in the form of a low voltage solenoid 90 provided with a spring loaded pawl 74. The solenoid 90 has a cylindrical body 92 and a central pin 94 which extends horizontally and parallel to the back 23 of the housing. The pawl 74 is mounted on a bracket 96 which is in turn mounted on an end of the pin 94. The bracket 96 extends perpendicularly from the pin 94 and is provided with an upright pivot pin 98 on which the pawl 74 is pivotally mounted and a spring mechanism 100 which biases the pawl 74 towards a position perpendicular to the pin 94. The pawl itself is elongate and has a curved end portion 102.

Normally, each actuator 40 has the configuration indicated as "B" in FIG. 2, with the pawl 74 located at one end of the aperture 72. On activation of the actuator 40, the pin 94 is pushed in the direction of arrow "C" into contact with a lower extension of divider 56 such that the inner conveyor portion 54 is rotated through the angle A, the pawl 74 and pin 94 reaching the position indicated as "D" before stopping. The pin 94 is then retracted, pulling the pawl 74 over the lower portion of the adjacent succeeding divider 56. A detent mechanism 104 provided between the pill tray 32 and the shelf 34 prevents rotation of the conveyor portion 54 in the opposite direction as the pawl 74 is deflected (as indicated in ghost outline) as it passes the divider 56 before assuming normal position "B" once more. In some circumstances the friction between the inner conveyor portion 54 and the outer package 52 may be sufficient to prevent rotation of the conveyor portion as the pawl is retracted.

Figure 4:
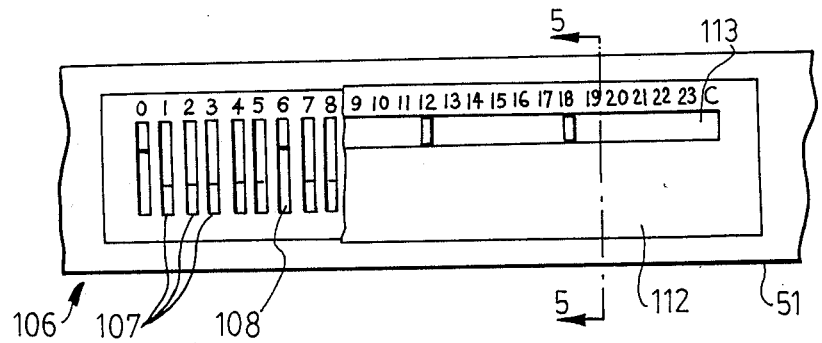
FIG. 4 is a partial side view of the dosage setting controls provided on a pill tray of the dispenser of FIG. 1.
Figure 5:
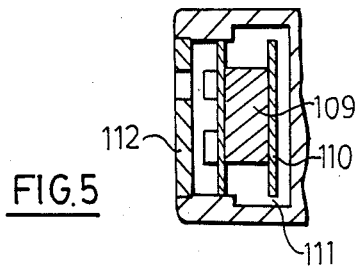
FIG. 5 is a partial sectional view on line 5—5 of FIG. 4.

FIGS. 4 and 5 illustrate the control switches 106 provided in the extended portion 51 (FIG. 1) of each pill tray which control the medication program information. The switches 106 are provided on the outer portion of each pill tray, where they are clearly visible to an operator. The switches comprise twenty five small sliders 107 individually located in complementary vertical slots 108 provided in a switch body 109 which contains the switch contacts and is itself mounted on a printed circuit board 110. The switch body 109 is located in recess 111 provided in the outer wall, an optional lockable access cover 112 being located over the recess to restrict access to the sliders 107. The cover 112 is provided with a longitudinal aperture 113 through which the heads of the sliders may be viewed. Each of the slots 108, and the longitudinal aperture in the cover, are numbered "0" through "23" and "C" and the sliders operate in conjunction with the dispenser control circuit to dispense a pill when the hour of the day coincides with the corresponding slider being in the upper position where it can be seen through slot 113. In the example illustrated in FIG. 4 the sliders are shown in positions to dispense pills at 00:00 (midnight), 06:00 (6:00 am), 12:00 (midday) and 18:00 (6:00 pm). The "C" slider is for control purposes.

Figure 6:
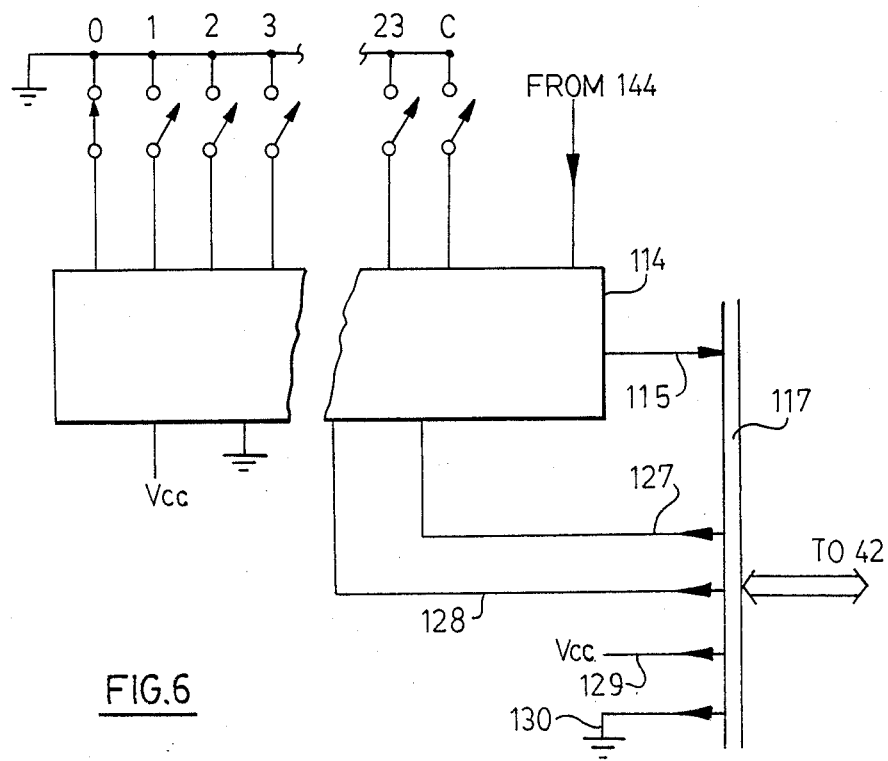
FIG. 6 is a block diagram of the circuitry associated with the dosage setting controls of FIG. 4.

Each of the sliders 107 has an electrical contact which is closed when the slider is moved to the upper, or active, position. To minimize interconnection requirements a parallel to serial shift register 114, as shown in FIG. 6, is provided on the printed circuit board 110 to convert signals into a single serial data line which passes from the shift register 114 and the printed circuit board 110 to a pill tray housing connection 117 and from there to the main printed circuit board 42. Full details of the operation of the control switches 106 will be provided in the later description of the control system.

The switch settings are entered by a physician or pharmacist when an empty pill tray is taken to be replenished. The pharmacist is equipped with a suitable key to open the access cover 112 to permit movement of the sliders 107, which have coloured heads to make them more clearly visible to the operator.

Figure 7:
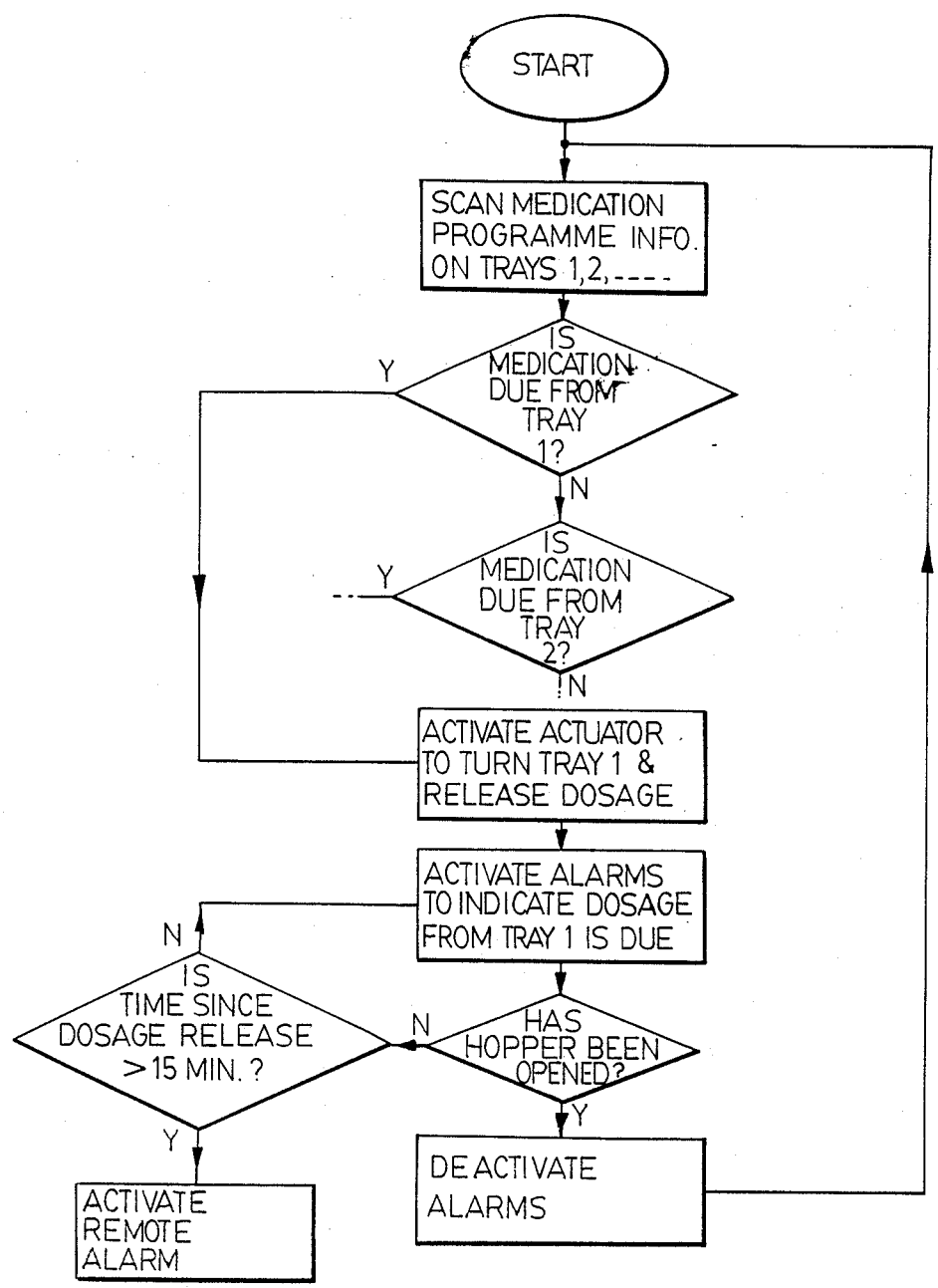
FIG. 7 is a flow chart of a typical pill dispensing operation.

A flowchart which illustrates a typical pill dispensing operation is illustrated in FIG. 7 of the drawings. Medication program information carried by the sliders 107 on each tray 3, is scanned, and at the appropriate time a selected one of the actuators 40 is activated. On activation of an actuator 40, conveyor portions 54 of the correspond pill tray 32 is rotated such that a dosage of pills is released into the hopper 44. The flashing light 48 and buzzer 50 are activated on activation of the actuator 40 to alert the user that a dosage of pills is due to be taken. The signals emitted by the light and the buzzer may vary, depending on which of tee pill trays 32 the dosage was released from and the signal continues until the user opens the hopper 44 to remove the pills. This deactivates the alarms. If the hopper 44 is not opened the dispenser may be provided with the feature whereby a remote alarm is activated to alert a supervisor that the user requires assistance.

The control features of the dispenser will now be described with reference to FIG. 8 of the drawings which is a block diagram of the exemplary control circuit for use with the dispenser, and also to FIG. 6 of the drawings which shows details of the dosage setting controls.

Figure 8:
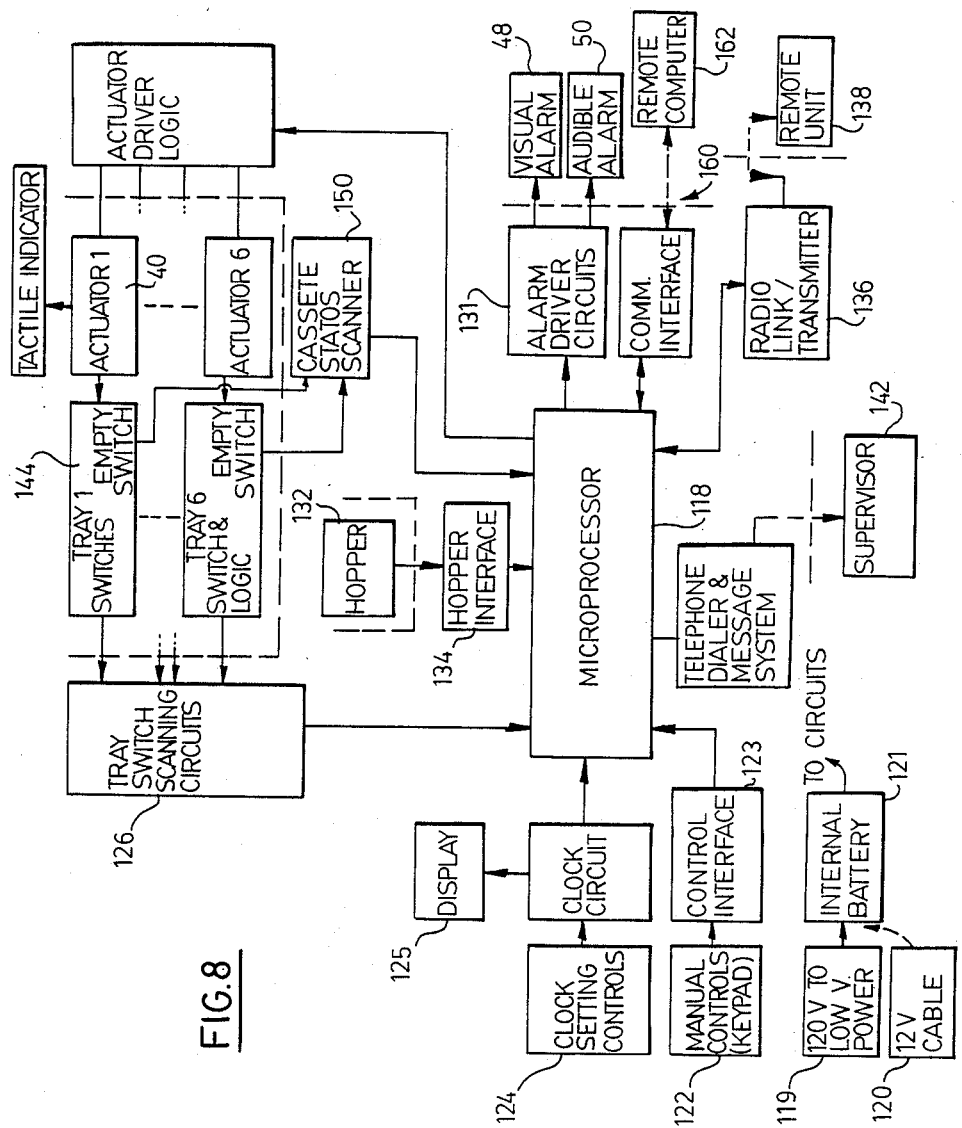
FIG. 8 is a block diagram of an exemplary control circuit for use with the dispenser of FIG. 1.

Reference is made first to FIG. 8 which shows the control circuit as contained within the printed circuit board 42. The circuit includes a microprocessor 118 which includes a real time system clock, read only memory ROM for programs, random access memory RAM for temporary storage, and various input and output circuits. Power for the microprocessor 118 and the other electrically operated components of the dispenser is normally supplied from the mains 119, a 12 volt cable 120 being provided for connection to an external battery for operation remote from a mains supply and a rechargable battery 121 being provided to power the unit in the event of failure of the mains supply. The battery 121 is capable of supplying power to the dispenser for a number of hours and is maintained at full charge by the external supply.

Inputs to the microprocessor 118 may be entered manually through a key pad 122 provided on the back 23 of the housing which accesses the microprocessor through an interface 123. The key pad 122 also includes clock setting controls 124 which may be used to set the clock in the microprocessor. An LED clock display 125 (FIG. 1) is also provided on the housing 22.

Information relating to times when dosages of pills should be dispensed from each pill tray is contained within the switches 106 mounted on the exterior of each tray and the housing is provided with tray switch scanning circuits 126 which read the data from the shift register 114 (FIG. 6) and pass this information to the microprocessor 118. The clock in the microprocessor clocks the shift register through link 127 and a further link 128 is also provided to reset or synchronize the shift register. The two remaining links 129, 130 provide the necessary power for operation.

When a switch 106 on a tray indicates a dosage is due, the microprocessor 118, through suitable actuator driver logic, activates the respective actuator 40 to turn the conveyor portion 54 of the associated pill tray 32 such that a dosage of pills fall into the hopper 44.

At the same time as the actuator is activated, alarm circuits 131 are activated and the visual alarm (flashing light) 48 and the audible alarm (buzzer) 50 are activated to indicate to the user that a dosage of pills is due to be taken. The alarms continue to operate until the hopper 44 is opened by the user. Opening of the hopper 44 resets the alarm driver circuits to the off mode by the operation of a hopper sensor 132 (FIG. 2) mounted on the housing 22 which is connected through a hopper interface 134 to the controlling microprocessor. The circuit may also include a radio transmitter 136 which transmits to a remote alarm unit 138 which the user may carry with them. The radio transmitter is also deactivated on opening of the hopper.

If the hopper 44 is not opened within a predetermined period, for example a quarter of an hour from the dosage of pills being dispensed, an optional automatic telephone dialler 140 located in the base of the housing 22 calls a preselected telephone number. When the answering telephone 142 is picked up, the telephone dialer plays a prerecorded message which indicates the location of the particular dispenser. Typically, the answering telephone would be located in the office of a supervising nurse or physician.

Each tray 32 is provided with a switch 144 to indicate when a tray 32 is empty. The switch 144 i formed of an extension of a radial divider 56a (FIG. 2) which provides an empty signal when the extension closes electrical contacts across the leading edge of the detent mechanism 104. The extension 56a also serves as a stop to prevent further rotation of the conveyor portion 54. This switch 144 is linked to the microprocessor 118 through the shift register 114. When a tray is determined to be empty, a further tray in the stack may be activated and concatenated to continue dispensing the dosages. In other situations the user or the remote supervisor may be informed that a tray is empty, for example, by a different alarm signal or by a prerecorded message. An empty tray can be removed from the housing and taken to a pharmacist or physician for replenishment. When replenishing the tray the pharmacist or physician may also alter the settings of the try switches to provide a different medication program and also must align the conveyor portion such that the empty indicating switch is in the desired location, that is, adjacent the detent mechanism 104 when the tray is placed in the dispenser if a full tray of pills is to be dispensed, or at some intermediate position if a lesser number is to be dispensed.

An external communication link 160 is also provided to allow the dispenser to communicate with remote computers 162 or other dispensers. This feature is used where it is desirable to monitor the operation of the dispenser from a central location and would be useful where central control of a number of dispensers was desired. In such circumstances, the medication program information required for activating the appropriate actuators may be supplied from a central control or from the dispenser's microprocessor memory, rather than from individual pill trays.

Other optional features which the dispenser includes are a panic button 170 (FIG. 1) which causes the automatic telephone dialer 140 to signal an emergency alert, and a disable switch 172 which allows the operation of the dispenser to be temporarily suspended.

In an alternative embodiment to that described above, the dispenser may be provided with tactile signalling means as shown as 180 in broken outline in FIGS. 1 and 2. The signalling means comprise a number of extension pins 182 which extend from each actuator pin 94 to apertures 184 in the side 26 of the housing. Normally, the end of each pin 182 lies flush with the side 26. However, on activation of the associated actuator the end of the pin 182 extends from the aperture 184. In this particular embodiment, the actuator 40 remains in the extended position until the user opens the hopper 44 such that by comparing a particular pin 182 with the raised numbers 81 on the side 26 the user may ascertain which tray 32 released the pills.

As can be ascertained from the above description, the dispenser provides automatically dispensed dosages of pills, of a number of different drugs if required, providing the user with an indication of when a dosage of pills is to be taken and an additional optional remote alarm that alerts a supervisor that a dosage has not been taken. Thus, use of a dispenser of the present invention should result in close compliance with medication programs. The remote alarm feature also provides an early alert if the user is incapacitated or in distress and is unable to reach the dispenser to take a dosage or to press the panic button.

It will be clear to those skilled in the art that the present invention may be put into effect utilizing a modified configuration to the non-limiting embodiments described above, particularly the configuration of the control circuit, the functions of which could be achieved by a variety of different circuit components or configurations.

We claim:

1. A dispenser for providing scheduled dosages of pills according to a selected medication program, the dispenser comprising;

housing means having a base and extending upwardly from the base, the housing means defining a plurality of horizontal shelves spaced one above the other;

a plurality of similar annular trays removeably positioned one on each of the shelves about a common vertical axis, each of the trays including an outer portion having locating structure and an inner conveyor portion moveable with respect to the outer portion about said axis;

location means coupled to the housing and cooperating with said locating structures to position and locate the outer portions of the trays relative to the housing means;

the conveyor portions and the outer portions of the respective trays combining to define a plurality of discrete pill containing portions separated by upright radial dividers to retain the pills individually as the conveyor portions are moved about said axis with the outer portions held stationary by the location means;

dispensing slots, one in each of said outer portions and facing inwardly of the annular trays so that when a pill is moved into registration with a dispensing slot, the pill falls through the tray generally along said axis;

a receptacle below the trays and coupled to the housing means for receiving falling pills so that the user can remove the pills;

actuator means coupled to the housing and engageable with the radial dividers of the trays to index the trays past the dispensing slots to bring the pill containing portions sequentially into registration with the dispensing slots; and programmable control means responsive to real time to power the actuator means in response to the requirement for said scheduled dosages.

2. A dispenser as claimed in claim 1 in which the trays and shelves are numbered consecutively for corresponding location of the numbered trays in the numbered shelves.

3. A dispenser as claimed in claim 1 in which the housing means includes an extension projecting over the uppermost one of the trays to cover the tray.

4. A dispenser as claimed in claim 1 in which the control means includes signalling means activated when the control means activates the actuator means to cause a pill to fall into the receptacle.

5. A dispenser as claimed in claim 4 in which the signalling means includes a flashing light.

6. A dispenser as claimed in claim 1 in which the trays include moveable indicators operable by an authorized person to identify the frequency of dosage of the pills contained in each of the trays.

7. A dispenser as claimed in claim 6 in which the control means includes means responsive to said indicators to operate the actuator means in accordance with the schedule identified on the trays.

* * * * *